US008881506B2

(12) United States Patent
Nakamura et al.

(10) Patent No.: US 8,881,506 B2
(45) Date of Patent: Nov. 11, 2014

(54) HYDRAULIC DRIVE DEVICE OF HYDRAULIC OPERATING MACHINE

(75) Inventors: Tsuyoshi Nakamura, Tsuchiura (JP); Kouji Ishikawa, Tsuchiura (JP); Yasushi Arai, Tsuchiura (JP); Hidenobu Tsukada, Tsuchiura (JP); Shohei Kamiya, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 361 days.

(21) Appl. No.: 13/393,758

(22) PCT Filed: Sep. 2, 2010

(86) PCT No.: PCT/JP2010/065023
§ 371 (c)(1), (2), (4) Date: Mar. 1, 2012

(87) PCT Pub. No.: WO2011/027822
PCT Pub. Date: Mar. 10, 2011

(65) Prior Publication Data
US 2012/0163996 A1 Jun. 28, 2012

(30) Foreign Application Priority Data
Sep. 4, 2009 (JP) ................................ 2009-204948

(51) Int. Cl.
*F01D 3/00* (2006.01)
*F16D 31/02* (2006.01)
*F04B 49/08* (2006.01)
*F02D 41/02* (2006.01)

(52) U.S. Cl.
CPC ........... *F04B 49/08* (2013.01); *F02D 2041/026* (2013.01); *F04B 2205/05* (2013.01); *F02D 41/029* (2013.01)
USPC ................. 60/286; 417/364; 60/282; 60/431; 60/452

(58) Field of Classification Search
USPC ............ 417/364, 379; 60/282, 285, 286, 295, 60/297, 431, 452, 487
See application file for complete search history.

(56) References Cited

U.S. PATENT DOCUMENTS 5,447,027 A * 9/1995 Ishikawa et al. ................ 60/420
5,974,796 A * 11/1999 Ishikawa et al. ................ 60/399

(Continued)

FOREIGN PATENT DOCUMENTS

EP 0 614 016 A1 9/1994
JP 63-297722 A 12/1988

(Continued)

OTHER PUBLICATIONS

International Search Report dated Nov. 16, 2010 with English translation (two (2) pages).

(Continued)

*Primary Examiner* — Peter J Bertheaud
(74) *Attorney, Agent, or Firm* — Crowell & Moring LLP

(57) ABSTRACT

A hydraulic drive system for a hydraulic working machine sets a delivery pressure at a preset value upon raising a temperature of exhaust gas to a temperature needed for combustion of particulate matter by increasing a load to be applied to an engine. In a non-operation state, a variable restrictor is controlled by a controller and a delivery pressure control valve to increase a delivery pressure of a variable displacement hydraulic pump, so that the load is increased to raise the temperature of exhaust gas to the temperature needed for the particulate matter combustion. At this time, the controller controls the delivery pressure control valve such that a delivery pressure to be detected by a delivery pressure sensor will conform with a preset reference delivery pressure. The reference delivery pressure is set to a minimum pressure that can provide the exhaust gas with combustion heat.

3 Claims, 4 Drawing Sheets

(56) References Cited

U.S. PATENT DOCUMENTS

| | | | | |
|---|---|---|---|---|
| 6,220,028 | B1 * | 4/2001 | Ishikawa et al. | 60/431 |
| 6,651,428 | B2 * | 11/2003 | Takahashi et al. | 60/447 |
| 7,523,606 | B2 * | 4/2009 | Strauser et al. | 60/300 |
| 7,716,920 | B2 * | 5/2010 | Onodera et al. | 60/295 |
| 8,161,736 | B2 * | 4/2012 | Tsukada et al. | 60/295 |
| 8,316,636 | B2 * | 11/2012 | Nakamura | 60/295 |
| 8,336,299 | B2 * | 12/2012 | Kamiya et al. | 60/295 |
| 8,459,008 | B2 * | 6/2013 | Kamiya et al. | 60/285 |
| 2004/0258537 | A1 | 12/2004 | Kim | |
| 2005/0155345 | A1 * | 7/2005 | Nakamura | 60/311 |
| 2011/0192156 | A1 * | 8/2011 | Sato et al. | 60/431 |
| 2012/0279203 | A1 * | 11/2012 | Arai et al. | 60/276 |

FOREIGN PATENT DOCUMENTS

| | | | |
|---|---|---|---|
| JP | 7-166840 | A | 6/1995 |
| JP | 3073380 | B2 | 8/2000 |
| JP | 2005-299436 | A | 10/2005 |
| JP | 2009-46998 | A | 3/2009 |

OTHER PUBLICATIONS

Chinese Office Action dated Jan. 30, 2014 (6 pages).

* cited by examiner

HYDRAULIC DRIVE DEVICE OF HYDRAULIC OPERATING MACHINE

TECHNICAL FIELD

This invention relates to a hydraulic drive system for a hydraulic working machine provided with an exhaust gas purification system for trapping in a filter particulate matter in exhaust gas as produced by incomplete combustion in an engine, in which in a non-operation state of the hydraulic working machine, an engine output is increased to provide the exhaust gas with heat needed for combustion of the particulate matter so that the particulate matter in the filter of the exhaust gas purification system is combusted and eliminated.

BACKGROUND ART

A hydraulic drive system for a hydraulic working machine is provided with an engine, a variable displacement hydraulic pump drivable by power transmitted from the engine, a hydraulic actuator drivable by hydraulic oil delivered from the variable displacement hydraulic pump, an actuator control valve interposed between the variable displacement hydraulic pump and the hydraulic actuator and switchable between a feed state, in which hydraulic oil is fed to the hydraulic actuator, and a non-feed state, in which the hydraulic oil is not fed to the hydraulic actuator but is returned to a hydraulic oil reservoir, and an exhaust gas purification system for trapping in a filter particulate matter in exhaust gas as produced by incomplete combustion in the engine.

The exhaust gas purification system is arranged in an exhaust pipe through which exhaust gas from the engine is guided to an exterior of the hydraulic working machine. The particulate matter trapped in the filter of this exhaust gas purification system is combusted by heat of the exhaust gas, and therefore, is eliminated from the filter.

The hydraulic working machine is constructed such that in its non-operation state, in other words, in the above-described non-feed state, an engine output is reduced, for the purpose of energy saving, to a level needed for the variable displacement hydraulic pump to deliver pressure oil at a lowest delivery pressure and a smallest delivery rate required for cooling and lubricating a hydraulic circuit.

When the engine output drops, the temperature of exhaust gas also drops. As a consequence, the combustion of particulate matter by the heat of the exhaust gas is rendered difficult to occur, and accordingly, the filter of the exhaust gas purification system becomes prone to clogging. To avoid clogging of the filter, the conventional hydraulic drive system for the hydraulic working machine is constructed such that, when clogging of the filter is detected, the delivery pressure and delivery rate of the variable displacement hydraulic pump are increased to make greater a load to be applied to the engine and the temperature of exhaust gas is allowed to rise to a temperature needed for the combustion of particulate matter. A means for increasing the delivery pressure is a selector valve that can open or close a line through which delivery oil of the variable displacement hydraulic pump is guided from the variable displacement hydraulic pump to the hydraulic oil reservoir. The hydraulic drive system is constructed that in the non-feed state, the delivery pressure is increased by controlling the selector valve (see, for example, Patent Document 1).

PRIOR ART DOCUMENT

Patent Document

Patent Document 1: JP-B-3073380

DISCLOSURE OF THE INVENTION

Problem to be Solved by the Invention

When it is desired to increase the output of an engine in a non-operation state to combust particulate matter, a load is applied to the engine. From the viewpoint of energy saving, the load may preferably be of a minimum level needed to raise the temperature of exhaust gas to a temperature required for the combustion of the particulate matter. However, the above-mentioned, conventional hydraulic drive system for the hydraulic working machine is not constructed to control a load, which is to be applied to the engine, to the minimum level.

An engine load is a value that is determined by the product of delivery pressure and delivery rate of a variable displacement hydraulic pump, and a delivery rate is a value that is determined by the product of displacement and engine rpm of the variable displacement hydraulic pump. Therefore, to apply the above-mentioned minimum load to the engine, a preset value for delivery pressure needs to be decreased as a preset value for the product of displacement and engine rpm is increased. Conversely, a preset value for delivery pressure needs to be increased as a preset value for the product of displacement and engine rpm is decreased. In other words, to apply the minimum load to the engine, the delivery pressure needs to be set at a lowest level in the relationship between the displacement and the engine rpm. However, the actual delivery pressure slightly differs from one hydraulic drive system to another due to a manufacturing error of each hydraulic drive system. This leads to variations among hydraulic drive systems that the actual delivery pressure becomes higher than a preset value in a hydraulic drive system but becomes lower than the preset value in another hydraulic drive system. An actual delivery pressure higher than the preset value results in a waste of an engine output, while an actual delivery pressure lower than the preset value leads to insufficient elimination performance for particulate matter.

With the above-mentioned circumstances in view, the present invention has as an object thereof the provision of a hydraulic drive system for a hydraulic working machine, which can surely control a delivery pressure to a preset value upon raising the temperature of exhaust gas to a temperature needed to combust particulate matter by increasing a load to be applied to an engine.

Means for Solving the Problem

To achieve the above-mentioned object, a hydraulic drive system according to the present invention for a hydraulic working machine is constructed as will be described next.

[1] The present invention is characterized in that in a hydraulic drive system for a hydraulic working machine, said hydraulic drive system being provided with an engine, a variable displacement hydraulic pump drivable by power transmitted from the engine, a hydraulic actuator drivable by hydraulic oil delivered from the variable displacement hydraulic pump, an actuator control valve interposed between the variable displacement hydraulic pump and the hydraulic actuator and switchable between a feed state, in which hydraulic oil from the variable displacement hydraulic pump is fed to the hydraulic actuator, and a non-feed state, in which the hydraulic oil from the variable displacement hydraulic pump is not fed to the hydraulic actuator but is returned to a hydraulic oil reservoir, an exhaust gas purification system for trapping in a filter particulate matter in exhaust gas produced by the engine, a delivery pressure control means for controlling a delivery pressure of the variable displacement hydraulic pump, and a control means for controlling the delivery pressure control means, and in the non-feed state, said control means being adapted to control the pressure control means to increase the delivery pressure of the variable displacement hydraulic pump such that a load on the engine is increased to raise a temperature of the exhaust gas to a temperature needed for combustion of the particulate matter, the hydraulic drive system is further provided with a pressure detection means for detecting the delivery pressure of the variable displacement hydraulic pump, and the control means controls the delivery pressure control means such that a delivery pressure to be detected by the pressure detection means will become equal to a preset delivery pressure.

In the present invention as described above in [1], the control means controls the pressure control means such that a delivery pressure to be detected by the pressure detection means will become equal to the preset delivery pressure. As a consequence, the delivery pressure can be surely controlled to the preset value upon raising the temperature of exhaust gas to the temperature, which is needed to combust particulate matter, by increasing a load to be applied to the engine.

[2] The present invention may also be characterized in that in the invention described above in [1], the pressure control means is a variable restrictor, and is arranged on an upstream side of the actuator control valve as viewed in a direction of a flow of pressure oil delivered from the variable displacement hydraulic pump.

[3] The present invention may also be characterized in that in the invention described above in [1], the pressure control means is a variable restrictor, and is arranged on a downstream side of the actuator control valve as viewed in a direction of a flow of pressure oil delivered from the variable displacement hydraulic pump.

Advantageous Effects of the Invention

According to the present invention, the delivery pressure, as mentioned above, can be surely controlled to the preset value upon raising the temperature of exhaust gas to the temperature, which is needed to combust particulate matter, by increasing a load to be applied to the engine. When eliminating clogging of the filter of the exhaust gas purification system in anon-operation state of the hydraulic working machine, it is, therefore, possible to reduce fuel consumption, thereby enabling to make a contribution to energy saving.

MODES FOR CARRYING OUT THE INVENTION

First Embodiment

Figure 1:
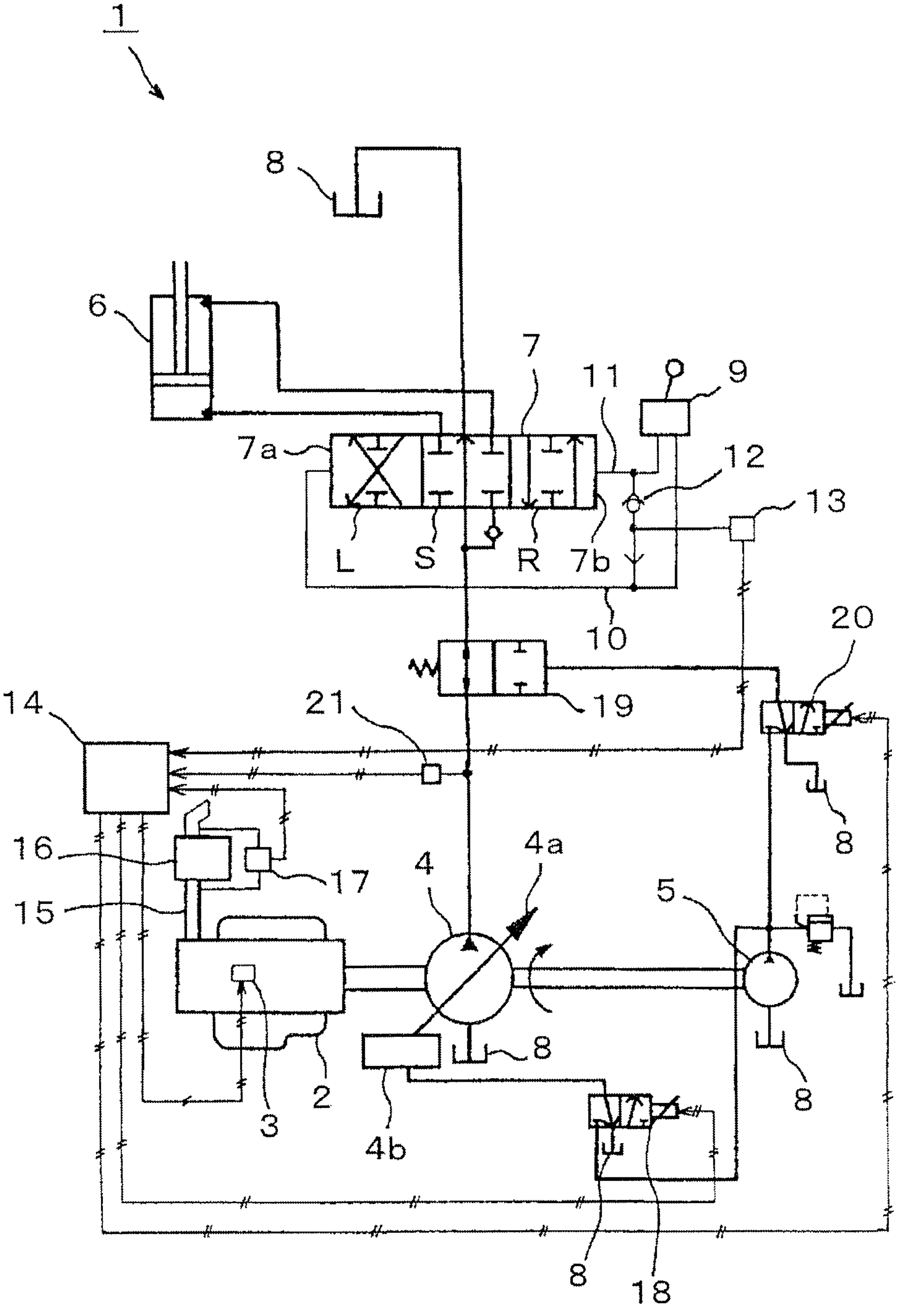
FIG. 1 is a hydraulic circuit diagram showing the construction of a hydraulic drive system according to a first embodiment of the present invention for a hydraulic working machine.
Figure 2:
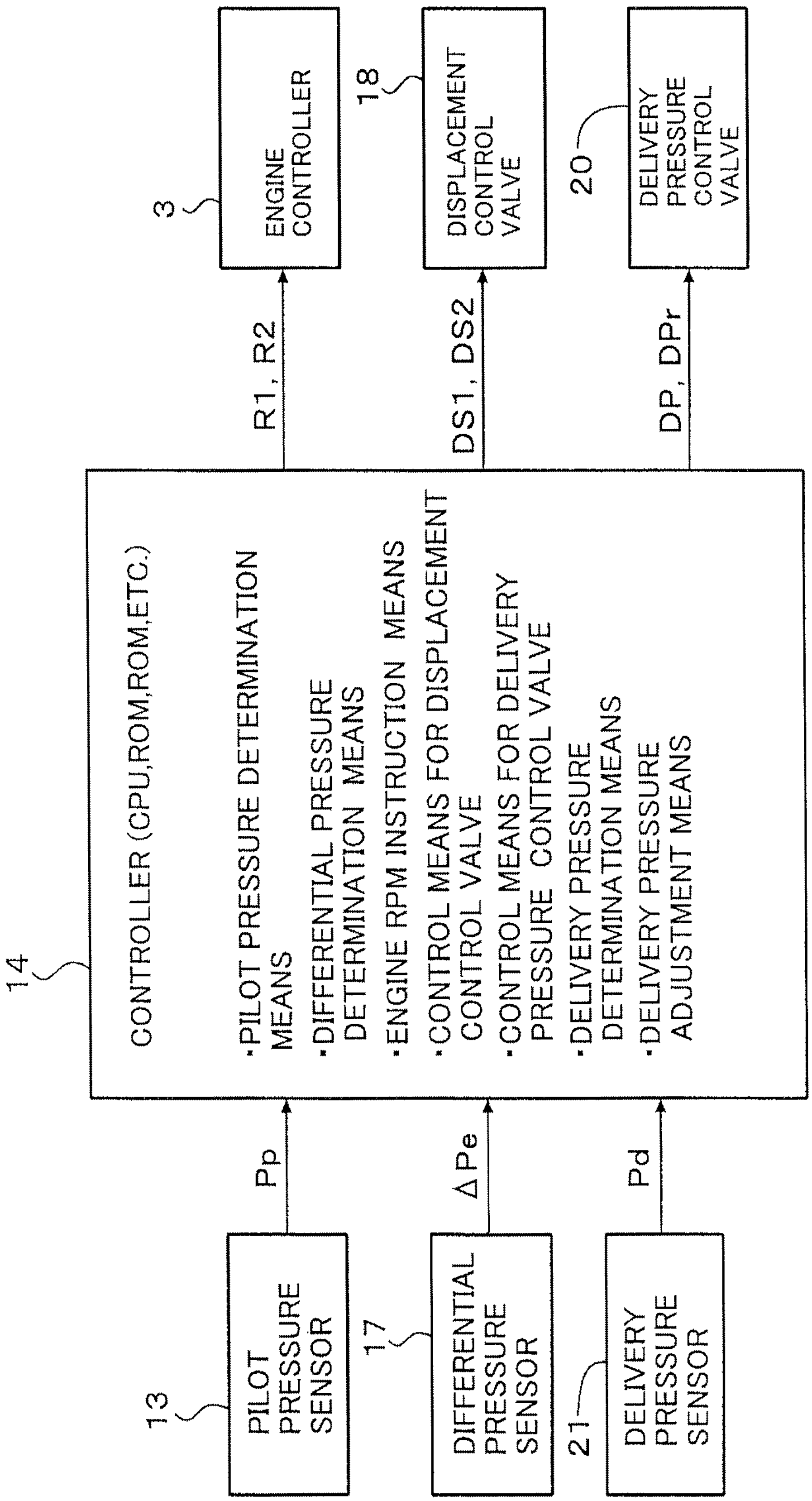
FIG. 2 is a block diagram depicting an electrical system extracted from the hydraulic drive system shown in FIG. 1.
Figure 3:
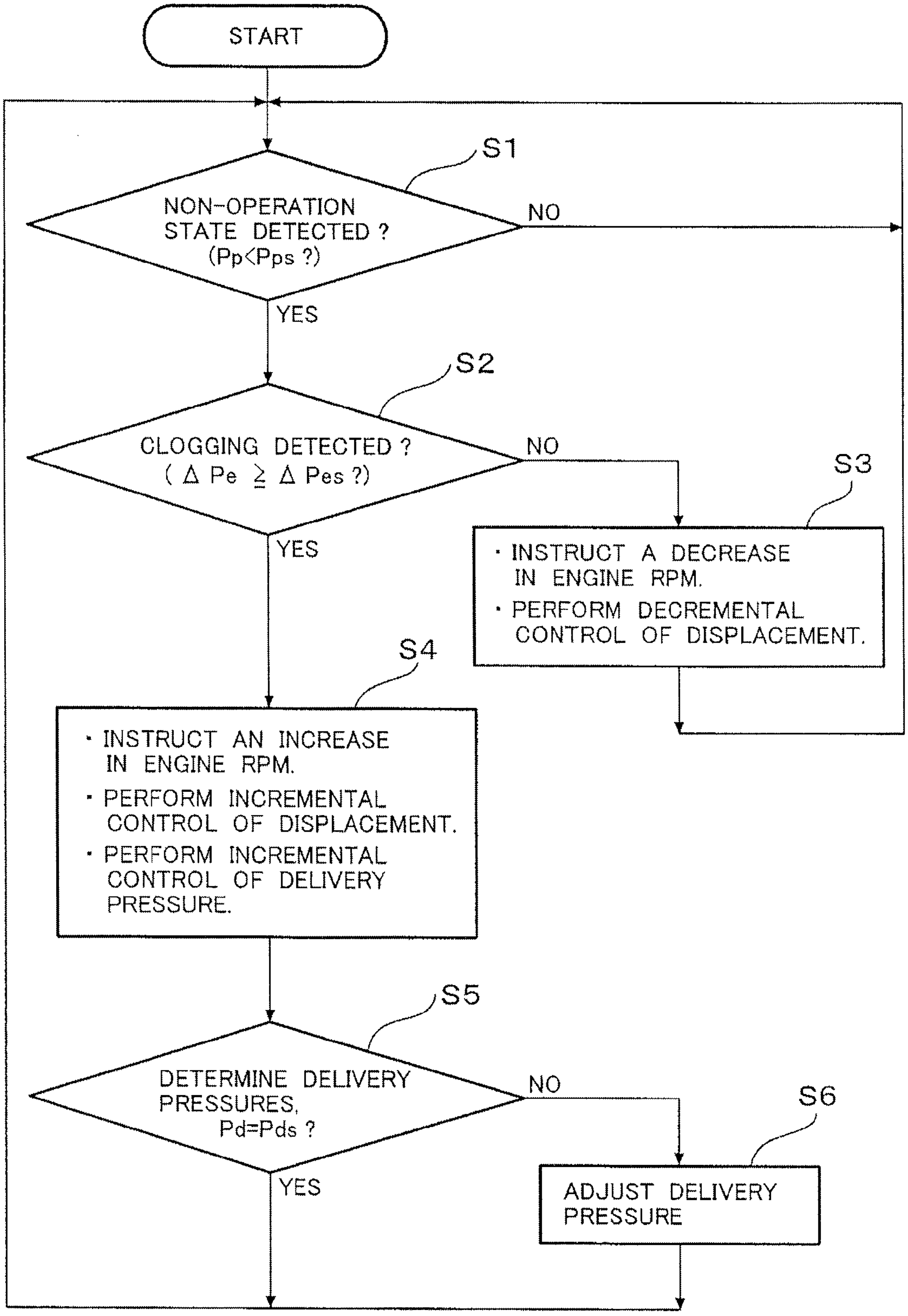
FIG. 3 is a flow chart illustrating a flow of processing at a controller depicted in FIG. 2.

With reference to FIG. 1, a description will be made about the hydraulic drive system according to the first embodiment of the present invention. FIG. 1 is a hydraulic circuit diagram showing the construction of the hydraulic drive system according to the first embodiment of the present invention. FIG. 2 is a block diagram depicting the electrical system extracted from the hydraulic drive system shown in FIG. 1. FIG. 3 is a flow chart illustrating the flow of processing at the controller depicted in FIG. 2.

As shown in FIG. 1, the hydraulic drive system 1 according to the first embodiment is provided with an engine 2 (for example, a diesel engine) electronically controlled in fuel injection quantity by an engine controller 3, a variable displacement hydraulic pump 4 and pilot pump 5 (fixed displacement pump) drivable by power transmitted from the engine 2, and a hydraulic actuator 6 drivable by hydraulic oil delivered from the variable displacement hydraulic pump 4. FIG. 1 shows a hydraulic cylinder as one example of the hydraulic actuator, but the hydraulic actuator may also be a hydraulic motor.

Interposed between the variable displacement hydraulic pump 4 and the hydraulic actuator 6 is an actuator control valve 7, which is switchable between a feed state, in which hydraulic oil from the variable displacement hydraulic pump 4 is fed to the hydraulic actuator 6, and a non-feed state, in which the hydraulic oil from the variable displacement hydraulic pump 4 is not fed to the hydraulic actuator 6. This actuator control valve 7 is a 3-position valve. In a neutral position S out of its three valve positions, the actuator control valve 7 is in the above-described non-feed state (the state shown in FIG. 1), and therefore, guides the hydraulic oil from the variable displacement hydraulic pump 4 to a hydraulic oil reservoir 8. In each of valve positions L,R on horizontally opposite sides of the neutral position S, the actuator control valve 7 is in the above-described feed state.

The actuator control valve 7 is also a hydraulically-piloted valve. A pilot pressure to be applied to the actuator control valve 7 is produced by a control device 9, which includes a pilot valve, while using as a primary pressure a delivery pressure of the pilot pump 5. The actuator control valve 7 is switched from the neutral position S toward the valve position L when a pilot pressure is applied from the control device 9 to a first pressure receiving portion 7*a* via a first pilot line 10, but is conversely switched from the neutral position S toward the valve position R when a pilot pressure produced by the control device 9 is applied to a second pressure receiving portion 7*b* via a second pilot line 11.

The first and second pilot lines 10,11 are connected to a high pressure selector valve 12. A pressure on a high pressure side as selected by the high pressure selector valve 12 is detected by a pressure sensor 13 (hereinafter called "the pilot pressure sensor 13"). This pilot pressure sensor 13 is constructed to convert a detected pressure Pp to a pilot pressure signal (electrical signal), and is arranged to input this pilot pressure signal to a controller 14.

The engine 2 is provided with an exhaust pipe 15 through which exhaust gas is guided to an exterior of the hydraulic working machine. This exhaust pipe 15 is provided at an intermediate position thereof with an exhaust gas purification system 16, which traps in a filter particulate matter in exhaust gas as produced by combustion in the engine 2.

The exhaust pipe 15 is provided with a differential pressure sensor 17 for detecting a differential pressure between an exhaust gas pressure on an upstream side of the exhaust gas purification system 16 and an exhaust gas pressure on a downstream side of the exhaust gas purification system 16. When the clogging amount of the filter of the exhaust gas purification system 16 increases, the flow path resistance to the exhaust gas increases so that the exhaust gas pressure on the upstream side becomes higher than the exhaust gas pressure on the downstream side. Accordingly, the differential pressure sensor 17 detects a differential pressure indicating that the exhaust gas pressure on the upstream side is higher than that on the downstream side. The differential pressure sensor 7 is constructed to convert a detected differential pressure ΔPe to a differential pressure signal (electrical signal), and is arranged to input this differential pressure signal to the controller 14.

The variable displacement hydraulic pump 4 has a displacement varying mechanism 4*a* and a hydraulically-piloted regulator 4*b*. The displacement varying mechanism 4*a* enables to vary the displacement of the variable displacement hydraulic pump 4, and the hydraulically-piloted regulator 4*b* controls this displacement varying mechanism 4*a*. A pilot pressure to be applied to the regulator 4*b* is produced by a displacement control valve 18. Using a delivery pressure of the pilot pump 5 as a primary pressure, the displacement control valve 18 produces the pilot pressure. This displacement control valve 18 is a solenoid valve, and responsive to a displacement control signal (electric current) from the controller 14, varies the pilot pressure to be applied to the regulator 4*b*.

In a line located on an upstream side of the actuator control valve 7 as viewed in the direction of a flow of pressure oil delivered from the variable displacement hydraulic pump 4, a variable restrictor 19 is arranged as a delivery pressure control means capable of raising a delivery pressure. This variable restrictor 19 is a spring-return, two-position valve, which with an open position being set as an initial position, can move a valve element toward a closed position. A pilot pressure to be applied to the variable restrictor 19 is produced by a delivery pressure control valve 20. Using a delivery pressure of the pilot pump 5 as a primary pressure, the delivery pressure control valve 20 produces the pilot pressure. This delivery pressure control valve 20 is a solenoid valve, and responsive to a delivery pressure control signal (electric current) from the controller 14, varies the pilot pressure to be applied to the variable restrictor 19. The delivery pressure control valve 20 and controller 14 make up a control means for the variable restrictor 19 (delivery pressure control means).

In a line between the variable displacement hydraulic pump 4 and the variable restrictor 19, a pressure sensor 21 (hereinafter called "the delivery pressure sensor 21") is arranged as a delivery pressure detection means for detecting a delivery pressure of the variable displacement hydraulic pump 4. The delivery pressure sensor 21 is constructed to convert a detected delivery pressure Pd to a delivery pressure signal (electrical signal), and is arranged to input this delivery pressure signal to the controller 14.

As depicted in FIG. 2, the controller 14 includes CPU, ROM and RAM, and is set by a computer program as will be described next.

The controller 14 is set to function as a pilot pressure determination means. This pilot pressure determination means determines whether or not a detected pressure Pp indicated by a pilot pressure signal from the pilot pressure sensor 13 is lower than a preset pressure Pps below which the actuator control valve 7 is to be actuated, in other words, whether a state of the actuator control valve 7 is the feed state, in which hydraulic oil from the variable displacement hydraulic pump 4 is fed to the hydraulic actuator 6, or the non-feed state, in which the hydraulic oil from the variable displacement hydraulic pump 4 is not fed to the hydraulic actuator 6. The feed state is an operation state of the hydraulic working machine, while the non-feed state is anon-operation state of the hydraulic working machine. The hydraulic drive system according to this embodiment is, therefore, constructed such that whether the hydraulic working machine is in an operation state or in a non-operation state can be determined by the high pressure selector valve 12, pilot pressure sensor 13 and controller 14.

The controller 14 is also set to function as a differential pressure determination means. This differential pressure determination means determines whether or not a detected differential pressure ΔPe indicated by a differential pressure signal from the differential pressure sensor 17 is at least a preset reference differential pressure ΔPes. As a result of clogging of the filter of the exhaust gas purification system 16, the flow path resistance to exhaust gas increases so that the detected differential pressure ΔPe becomes higher. The hydraulic drive system according to this embodiment is, therefore, constructed such that clogging of the filter of the exhaust gas purification system 16 can be determined by the differential pressure sensor 17 and controller 14.

The controller 14 is also set to function as an engine rpm instruction means. This engine rpm instruction means delivers a preset first target rpm signal R1 to the engine controller 3. For the purpose of energy saving, the first target rpm has been set to lower the engine rpm to a level needed for the variable displacement hydraulic pump 4 to deliver pressure oil at a lowest delivery pressure and a smallest delivery rate required for cooling and lubricating a hydraulic circuit.

In addition, the engine rpm instruction means also switches the target rpm signal, which is to be delivered to the engine controller 3, from the first target rpm signal R1 to a second target rpm signal R2. This second target rpm signal R2 is a signal corresponding to a preset second target rpm. This second target rpm is greater than the first target rpm.

The controller 14 is also set to function as a control means for the displacement control valve. This control means for the displacement control valve delivers a first displacement control signal DS1, which corresponds to a preset first displacement, to the displacement control valve 18. When the displacement control valve 18 applies to the regulator 4*b* a pilot pressure responsive to the first displacement control signal DS1, the regulator 4*b* operates the displacement varying mechanism 4*a* to set the displacement of the variable displacement hydraulic pump 4 at the first displacement. When the variable displacement hydraulic pump 4 is driven by the engine 2 operated at the first target rpm in the state that it is set at the first displacement volume, pressure oil is delivered at the above-described smallest delivery rate.

In addition, the control means for the displacement volume control valve also switches the displacement control signal, which is to be delivered to the displacement control valve 18, from the first displacement control signal DS1 to a preset second displacement control signal DS2. When the displacement control valve 18 applies to the regulator 4*b* a pilot pressure responsive to the second displacement control signal DS2, the regulator 4*b* operates the displacement varying mechanism 4*a* to set the displacement of the variable displacement hydraulic pump 4 at the second displacement. When the variable displacement hydraulic pump 4 is driven by the engine 2 operated at the second target rpm in the state that it is set at the second displacement volume, pressure oil is delivered at a delivery rate higher than the above-described smallest delivery rate.

The controller 14 is also set to function as a control means for the delivery pressure control valve. This control means for the delivery pressure control valve delivers to the delivery pressure control valve 20 a delivery pressure control signal DP of a preset current value. When the delivery pressure control valve 20 delivers to the variable restrictor 19 a pilot pressure responsive to the delivery pressure control signal DP, the valve position of the variable restrictor 19 moves from the open position (initial position) toward the closed position. As a consequence, the delivery pressure rises.

The controller 14 is also set to function as a delivery pressure determination means. This delivery pressure determination means calculates a difference between the detected delivery pressure Pd indicated by the delivery pressure signal from the delivery pressure sensor 21 and the preset reference delivery pressure Pds, and determines from this difference whether the detected delivery pressure Pd is in conformity with the reference delivery pressure Pds.

The controller 14 is also set to function as a delivery pressure adjustment means. Based on the difference between the detected delivery pressure Pd and the reference delivery pressure Pds as calculated by the delivery pressure determination means, this delivery pressure adjustment means calculates an amount of control required for the delivery pressure control valve 20 to bring the detected delivery pressure Pd and the reference delivery pressure Pds into conformity with each other, and delivers to the delivery pressure control valve 20 a delivery pressure adjustment signal DPr of a current value corresponding to the amount of control.

A relationship among the second target rpm, second displacement and reference delivery pressure Pds is set such that by increasing a load (engine load) to be applied to the engine, the temperature of exhaust gas can be raised to a minimum level needed to raise it to a temperature required for the combustion of particulate matter. In other words, the reference delivery pressure Pds is set such that the engine load based on the second target rpm and the second displacement becomes equal to the minimum level for raising the temperature of exhaust gas to a temperature needed for the combustion of particulate matter.

Furthermore, the controller 14 is also set to perform the processing by the respective means as a flow illustrated in FIG. 3. A description will be made about the flow of processing.

The controller 14 first functions as the pilot pressure determination means, and determines whether or not a detected pressure Pp indicated by a pilot pressure signal from the pilot pressure sensor 13 is lower than the preset pressure Pps (step S1). The controller 14 repeats this step S1 as long as the detected pressure Pp falls lower than the preset pressure Pps, in other words, as long as a non-operation state of the hydraulic working machine is not detected ("NO" in step S1).

Upon detection of a non-operation state of the hydraulic working machine ("YES" in step S1), the controller 14 then functions as the differential pressure determination means, and determines whether or not a detected differential pressure ΔPe indicated by a differential pressure signal from the differential pressure sensor 17 is at least the reference differential pressure ΔPes (step S2). When the detected differential pressure ΔPe is not determined to be at least the reference differential pressure ΔPes, in other words, when clogging of the filter of the exhaust gas purification system 16 is not detected ("NO" in step S2), the controller 14 functions as the engine rpm instruction means and the control means for the displacement control valve, and delivers the first target rpm signal R1 to the engine controller 3 and also the first displacement control signal DS1 to the displacement control valve 18. At this time, the valve position of the actuator control valve 7 is the neutral position S, and the valve position of the delivery pressure control valve 20 is the open position (initial position). When the engine rpm reaches the first target rpm and the displacement reaches the first displacement, the variable displacement hydraulic pump 4 is brought into a state, in which it delivers pressure oil at a lowest delivery pressure and a smallest delivery rate needed for the cooling and lubrication of the hydraulic circuit. Subsequently, the controller 14 performs again the processing from step S1. In a state that a non-operation state of the hydraulic working machine has been detected and in a state that no clogging has been detected, "step S1→step S2→step S3→step S1" is repeated. As a consequence, the variable displacement hydraulic pump 4 is maintained in the state that the variable displacement hydraulic pump 4 delivers pressure oil at a lowest delivery pressure and a smallest delivery rate needed for the cooling and lubrication of the hydraulic circuit.

Upon detection of clogging of the filter of the exhaust gas purification system 16 ("YES" in step 2), the controller 14 then functions as the engine rpm instruction means. The controller 14, therefore, switches the target rpm signal, which is to be delivered to the engine controller 3, from the first target rpm signal R1 to the second target rpm signal R2 to increase the engine rpm to the second target rpm (step S4).

At this time, the controller 14 also functions as the control means for the displacement control valve, and switches the displacement control signal, which is to be delivered to the displacement control valve 18, from the first displacement control signal DS1 to the second displacement control signal DS2 to increase the displacement of the variable displacement hydraulic pump 4 to the second displacement (step S4).

Further, the controller 14 also functions as the control means for the delivery pressure control valve, and delivers a delivery pressure control signal DP to the delivery pressure control valve 20 (step S4). When the delivery pressure control valve 20 applies to the variable restrictor 19 a pilot pressure responsive to the delivery pressure control signal DP, the valve position of the variable restrictor 19 moves from the open position (initial position) to the closed position, and as a consequence, the delivery pressure increases.

Next, the controller 14 functions as the delivery pressure determination means, calculates the difference between a detected delivery pressure Pd indicated by the delivery pressure signal from the delivery pressure sensor 21 and the reference delivery pressure Pds, and determines from the difference whether or not the detected delivery pressure Pd is in conformity with the reference delivery pressure Pds. When the detected delivery pressure Pd and the reference delivery pressure Pds are determined to be in conformity with each other, the flow of processing is returned to step S1.

When the detected delivery pressure Pd and the reference delivery pressure Pds are not determined in conformity with each other, on the other hand, the controller 14 then functions as the delivery pressure adjustment means. Described specifically, based on the above-described difference between the detected delivery pressure Pd and the reference delivery pressure Pds as calculated by the delivery pressure determination means, this delivery pressure adjustment means calculates an amount of control required for the delivery pressure control valve 20 to bring the detected delivery pressure Pd and the reference delivery pressure Pds into conformity with each other, and delivers to the delivery pressure control valve 20 a delivery pressure adjustment signal DPr of a current value corresponding to the amount of control to adjust the valve position of the variable restrictor 19. As a consequence, the delivery pressure is adjusted from a level, which is higher or lower than a minimum level needed to raise the temperature of exhaust gas to a temperature required for the combustion of particulate matter, to the minimum level (=reference delivery pressure Pds).

According to the hydraulic drive system 1 of the first embodiment, the following advantageous effects can be obtained.

The hydraulic drive system 1 controls the variable restrictor 19 by the delivery pressure control valve 20 and controller 14 such that the detected delivery pressure Pd is brought into conformity with the reference delivery pressure Pds. As a consequence, upon raising the temperature of exhaust gas to a temperature required at the minimum for the combustion of particulate matter by increasing a load to be applied to the engine, the delivery pressure can be surely controlled to the preset value (reference delivery pressure Pds). When eliminating clogging of the filter of the exhaust gas purification system 16 in a non-operation state of the hydraulic working machine, it is, therefore, possible to reduce fuel consumption and to make a contribution to energy saving.

The hydraulic drive system according to the present invention is not limited to the first embodiment, and may be constructed as will be described next.

The hydraulic drive system 1 according to the first embodiment is constructed such that, when it is desired to increase the engine output for the combustion of particulate matter, the delivery rate is increased by increasing the engine rpm and displacement. The hydraulic drive system according to the present invention may, however, be constructed to increase the delivery rate by increasing the engine rpm only.

In the hydraulic drive system 1 according to the first embodiment, the delivery pressure control valve 20 and controller 14 (control means for the delivery pressure control valve) make up the control means for the hydraulically-piloted variable restrictor 19 (delivery pressure control means). As an alternative, an electromagnetically-piloted variable restrictor may be arranged in place of the hydraulically-piloted variable restrictor 19 and the delivery pressure control valve 20, in other words, the delivery pressure control means may be comprised of an electromagnetically-piloted variable restrictor, and a controller alone may function as a control means for the variable restrictor (delivery pressure control means). When the variable restrictor is of the hydraulic pilot type, there is an advantage in that the power for the variable restrictor can be easily obtained compared with when the variable restrictor is of the electromagnetic pilot type. When the variable restrictor is of the electromagnetic pilot type, on the other hand, there is an advantage in that the hydraulic circuit can be simplified compared with when the variable restrictor is of the hydraulic pilot type.

Second Embodiment

Figure 4:
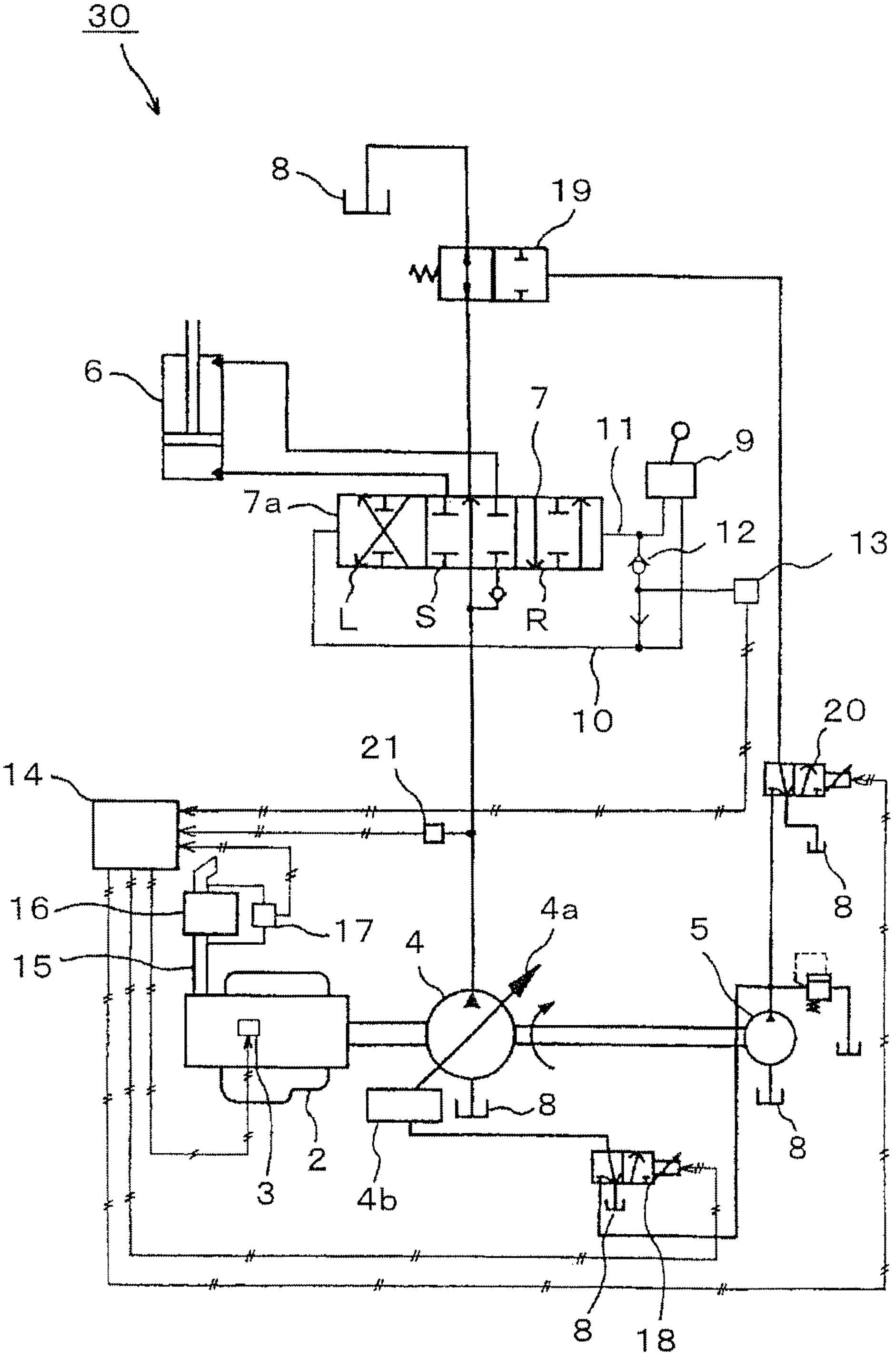
FIG. 4 is a hydraulic circuit diagram showing the construction of a hydraulic drive system according to a second embodiment of the present invention for a hydraulic working machine.

With reference to FIG. 4, a description will be made about the hydraulic drive system according to the second embodiment of the present invention for the hydraulic working machine. FIG. 4 is a hydraulic circuit diagram showing the construction of the hydraulic drive system according to the second embodiment of the present invention.

As shown in FIG. 4, in the hydraulic drive system 30 according to the second embodiment, the variable restrictor 19 is arranged on a downstream side of the actuator control valve 7 as viewed in a direction of a flow of pressure oil delivered from the variable displacement hydraulic pump 4. The remaining construction of the hydraulic drive system 30 is similar to the hydraulic drive system 1 according to the first embodiment.

In the hydraulic drive system 30, however, the variable restrictor 19 restricts a drain passage for pressure oil from the actuator control valve 7 to the hydraulic oil reservoir 8. There is, accordingly, a potential concern that, even when the actuator control valve 7 is in the non-feed state (the neutral position S), a delivery pressure may leak through the actuator control valve 7 to cause a malfunction of the hydraulic actuator 6. To eliminate this potential concern, the relationship among the second target rpm, the second displacement and the reference delivery pressure Pds is set such that the engine load is controlled to a minimum level needed to raise the temperature of exhaust gas to a temperature required for the combustion of particulate matter, and in addition, the reference delivery pressure Pds is set to be low enough to avoid inducing the above-described malfunction.

By the hydraulic drive system 30 according to the second embodiment constructed as described above, similar advantageous effects can also be obtained as those available from the hydraulic drive system 1 according to the first embodiment.

LEGEND

1 Hydraulic drive system
2 Engine
3 Engine controller
4 Variable displacement hydraulic pump
**4*a*** Displacement varying mechanism
**4*b*** Regulator
5 Pilot pump
6 Hydraulic actuator
7 Actuator control valve
**7*a*** First pressure receiving portion
**7*b*** Second pressure receiving portion
8 Hydraulic oil reservoir
9 Control device
10 First pilot line
11 Second pilot line
12 High pressure selector valve
13 Plot pressure sensor
14 Controller
15 Exhaust pipe
16 Exhaust gas purification system
17 Differential pressure sensor
18 Displacement control valve
19 Variable restrictor
20 Delivery pressure control valve
21 Delivery pressure sensor

The invention claimed is:

1. A hydraulic drive system for a hydraulic working machine, said hydraulic drive system being provided with an engine, a variable displacement hydraulic pump drivable by power transmitted from the engine, a hydraulic actuator drivable by hydraulic oil delivered from the variable displacement hydraulic pump, an actuator control valve interposed between the variable displacement hydraulic pump and the hydraulic actuator and switchable between a feed state, in which hydraulic oil from the variable displacement hydraulic pump is fed to the hydraulic actuator, and a non-feed state, in which the hydraulic oil from the variable displacement hydraulic pump is not fed to the hydraulic actuator but is returned to a hydraulic oil reservoir, an exhaust gas purification system for trapping in a filter particulate matter in exhaust gas produced by the engine, a delivery pressure control device for controlling a delivery pressure of the variable displacement hydraulic pump, and a control unit for controlling the delivery pressure control device, and in the non-feed state, said control unit being adapted to control the delivery pressure control device to increase the delivery pressure of the variable displacement hydraulic pump such that a load on the engine is increased to raise a temperature of the exhaust gas to a temperature needed for combustion of the particulate matter, wherein:

the hydraulic drive system is further provided with a pressure detection device arranged between the variable displacement hydraulic pump and the delivery pressure control device for detecting the delivery pressure of the variable displacement hydraulic pump, and, when clogging of the filter of the exhaust gas purification system is not detected, the control unit controls at least an rpm of the engine to a first target rpm such that the variable displacement hydraulic pump delivers pressure oil at a lowest delivery pressure and a smallest delivery rate needed for cooling and lubricating a hydraulic circuit, and upon detection of clogging of the filter of the exhaust gas purification system, the control unit controls at least the rpm of the engine to a second target rpm, which is higher than the first target rpm, such that the variable displacement hydraulic pump delivers pressure oil at a delivery pressure and a delivery rate to raise the temperature of the exhaust gas to a temperature needed for the combustion of the particulate matter, and also controls the delivery pressure control device such that a delivery pressure to be detected by the pressure detection device will become equal to a preset delivery pressure corresponding to a load of a minimum level for raising the temperature of the exhaust gas to a temperature needed for the combustion of the particulate matter.

2. The invention hydraulic drive system according to claim 1, wherein:

the delivery pressure control device is a variable restrictor, and is arranged on an upstream side of the actuator control valve as viewed in a direction of a flow of pressure oil delivered from the variable displacement hydraulic pump.

3. The invention hydraulic drive system according to claim 1, wherein:

the delivery pressure control device is a variable restrictor, and is arranged on a downstream side of the actuator control valve as viewed in a direction of a flow of pressure oil delivered from the variable displacement hydraulic pump.

* * * * *